United States Patent Office 2,823,206
Patented Feb. 11, 1958

2,823,206

METHOD FOR THE PREPARATION OF TRIMETHYLCOLCHICINIC ACID

Glenn E. Ullyot, Philadelphia, Pa., assignor to Smith, Kline & French Laboratories, Philadelphia, Pa., a corporation of Pennsylvania No Drawing. Application July 20, 1953
Serial No. 369,247

4 Claims. (Cl. 260—284)

This invention relates to a method for the preparation of trimethylcolchicinic acid.

Trimethylcolchicinic acid is a compound known to the art and is useful as an intermediate in the preparation of colchicine derivatives which have a marked effect on cell division. Thus, for example, trimethylcolchinic acid is used in the preparation of trimethylcolchicinic acid methyl ethers and salts thereof which are inhibitors of mitosis.

In accordance with this invention, colchicine, which is a compound well known to the art, is dissolved in sulfuric acid or phosphoric acid solution and the solution heated to effect the hydrolysis of colchicine to trimethylcolchicinic acid.

The sulfuric or phosphoric acid solution preferably will have a concentration of from 20 to 50% by weight of acid, but may have from 10 to 75% by weight of acid. Preferably about 1 part by weight of colchicine is added to from about 20 to 30 parts of acid solution, but it will be obvious that wide variations are practical. The colchicine-acid solution is heated and maintained at a temperature within a wide range but preferably from about 80° to 110° C. until the reaction is substantially complete, which can be determined by, for example, the ferric chloride test wherein a few drops of ferric chloride is added to a test portion of the solution, which is then shaken with a small amount of chloroform. When the ferric chloride does not impart a garnet red color to the chloroform layer, the reaction is substantially complete. The reaction time is usually from four to six hours but will obviously vary depending on the concentration of the acid and the temperature used.

An alkaline reagent such as, for example, sodium carbonate, sodium bicarbonate, ammonium hydroxide, sodium hydroxide or potassium hydroxide is added after the heating to adjust the pH to about 7 to 7.5, which results in the precipitation of the trimethylcolchicinic acid. The neutralization is preferably carried out in the hot solution to minimize emulsion formation.

The precipitate may be collected on a filter, washed with cold water and sucked dry with a vacuum. The product is crystallized from a suitable solvent, such as a lower aliphatic alcohol, as, for example, methanol, ethanol, or propanol, and dried in vacuo.

The following examples will further clarify the invention:

Example 1

A mixture of 53 g. of purified colchicine, 250 cc. of concentrated (sp. g. 1.84) sulfuric acid solution, and one liter of water was heated on a steam bath with stirring for 5 hours. The hot solution was neutralized (pH=7-7.5) with solid sodium carbonate and allowed to cool to room temperature. The light yellow frothy mass was filtered, and the collected solid was washed with cold water and sucked dry. The product was crystallized from ethanol. The air-dried, light yellow needles, M. P. 152–158° C., weighed 35 g.; 1–2 g. of additional material was obtained by extraction of the aqueous filtrates with chloroform.

As illustrative of utility, twenty grams of crude trimethylcolchicinic acid (containing alcohol of crystallization) was dissolved in 400 cc. of methylene chloride and treated with a methylene chloride-ether solution (500 cc., 1:1) of diazomethane prepared from 13 g. of nitrosomethylurea and 60 cc. of 40% potassium hydroxide. The mixture was kept at 0–5° until all of the solid had dissolved and the solution no longer gave a green color with 1% ferric chloride solution. A small amount of finely divided amorphous material was removed by filtration, and the solvents were evaporated in vacuo. The crude product was dissolved in chloroform, the chloroform solution was washed with dilute sodium hydroxide and water and was evaporated to dryness in vacuo. The bright yellow amorphous residue weighed 21.5 g.

A sample of the crude mixed ethers prepared as described above was dissolved in ethanol, d-tartaric acid (10% excess) was added, and the mixture was heated on the hot plate until a solid began to separate. After cooling overnight the mixture was filtered and the solid was resuspended in hot ethanol. Water was added dropwise until solution was effected, the solution was treated with Norit, filtered, and again allowed to cool. The white microcrystalline powder of trimethylcolchicinic acid methyl ether d-tartrate thus obtained was then crystallized from acetone-water and dried over phosphorus pentoxide; M. P. 218.5–220° dec. This material has utility as an inhibitor of mitosis.

Example 2

Five grams of colchicine were dissolved in 175 cc. of phosphoric acid solution (50% by weight of phosphoric acid) and the mixture was heated, with stirring, for five hours at 90° C. The hot solution was then neutralized to pH=7.5 with solid sodium carbonate and after cooling to room temperature was filtered by suction. The bright yellow solid was washed with cold water, air dried, and crystallized from ethanol. There was obtained 3 g. of light yellow needles, M. P. 150–153° C. A small additional amount of less pure material could be obtained from the aqueous filtrates by extraction with chloroform.

Example 3

The procedure of Example 2 was followed using 5 g. of colchicine in 175 cc. phosphoric acid solution (26% by weight of phosphoric acid) at reflux temperature. Identical results were obtained, i. e., 3 g. of trimethylcolchicinic acid, M. P. 150–153° C. (from ethanol) were isolated, and an additional quantity could be obtained from the aqueous filtrates by extraction with chloroform.

It is not desired to be limited except as set forth in the following claims, the above description being by way of illustration only.

What is claimed is:

1. The method of preparing trimethylcolchicinic acid which comprises dissolving colchicine in an acid selected from the group consisting of sulfuric acid, and phosphoric acid, maintaining the solution at a temperature within the range of about 80 to 110° C. to effect the hydrolysis of colchicine to trimethylcolchicinic acid, said acid having a concentration of from about 10 to 75% by weight of acid.

2. The method of preparing trimethylcolchicinic acid which comprises dissolving colchicine in an acid selected from the group consisting of sulfuric acid, and phosphoric acid, maintaining the solution at a temperature within the range of about 80 to 110° C. to effect the hydrolysis of cholchicine to trimethylcolchicinic acid, said acid having a concentration of from about 20 to 50% by weight of acid.

3. The method of preparing trimethylcolchicinic acid which comprises dissolving colchicine in sulfuric acid and maintaining the solution at a temperature within the range of about 80 to 110° C. to effect the hydrolysis of colchicine to trimethylcolchicinic acid, said acid having a concentration of from about 20 to 50% by weight of acid.

4. The method of preparing trimethylcolchicinic acid which comprises dissolving colchicine in phosphoric acid and maintaining the solution at a temperature within the range of about 80 to 110° C. to effect the hydrolysis of colchicine to trimethylcolchicinic acid, said acid having a concentration of from about 20 to 50% by weight of acid.

References Cited in the file of this patent

The Alkaloids, Manske et al.; vol. II, Academic Press Inc. (N. Y.), 1952, p. 264.

Ann. Chim. Phys., Oberlin, vol. 108, tome 50, pp. 108–14 (1857).

Groggins: "Unit Processes in Organic Synthesis" (1947), 3rd ed., page 672–3.

Henry: "The Plant Alkaloids" (1949), 4th ed., p. 651.